United States Patent [19]

Hummel et al.

[11] 4,168,494

[45] Sep. 18, 1979

[54] LIVESTOCK CONFINEMENT STRUCTURE MONITOR

[75] Inventors: Jon E. Hummel, Auburn; John E. Gupton, Springfield, both of Ill.

[73] Assignee: Dickey-john Corporation, Auburn, Ill.

[21] Appl. No.: 833,452

[22] Filed: Sep. 15, 1977

[51] Int. Cl.² .............................................. G08B 19/00
[52] U.S. Cl. .................................. 340/521; 340/531; 340/539
[58] Field of Search ................... 340/213 R, 214, 224, 340/409, 412, 413, 416, 420, 506, 521, 531, 539, 541; 325/308

[56] References Cited

U.S. PATENT DOCUMENTS

| 2,839,736 | 6/1958 | Tinsley et al. ...................... 340/63 |
| 3,531,793 | 9/1970 | Shottenfeld ......................... 340/63 |
| 3,792,435 | 2/1974 | Pace et al. ........................... 340/63 |
| 3,815,112 | 6/1974 | Kleber ................................. 340/514 |
| 3,996,578 | 12/1976 | Takeuchi et al. .................... 340/416 |

OTHER PUBLICATIONS

Pamphlet-brochure, "Farm Alarm"; S. A. Clark and Associates, 6 pages.

Primary Examiner—Alvin H. Waring

Attorney, Agent, or Firm—Trexler, Wolters, Bushnell & Fosse, Ltd.

[57] ABSTRACT

A monitor for a plurality of functions associated with a structure such as a livestock confinement structure or the like including detecting fire or intrusion, and monitoring temperature, water supply, ventilation and power supply. The monitor comprises a plurality of sensors mounted at a plurality of locations about the structure adapted for detecting and/or monitoring the above mentioned parameters and providing respective electrical signals corresponding thereto. An electronic circuit is connected with the sensors and includes first indicator circuits connected with the sensors associated with temperature monitoring for producing indication signals in response to variations in the electrical signals therefrom from predetermined ranges of values, and second indicator circuits connected with the remaining sensors for producing indication signals in response to predetermined values of the electrical signals therefrom. Indicators such as visual or audible alarms are connected with the indicator circuits for producing indications in response to the indication signals. In a preferred embodiment, a radio transmitter is connected with the indicator circuits for transmitting the indication signals to a remote radio receiver for receiving the signals and including indicators such as visual and audible alarms.

16 Claims, 8 Drawing Figures

LIVESTOCK CONFINEMENT STRUCTURE MONITOR

BACKGROUND OF THE INVENTION

This invention relates generally to a monitor for a plurality of functions associated with a structure, and specifically to a monitor for a plurality of functions associated with a livestock confinement structure or the like.

The present invention is suitable for use in a broad range of applications, as for example, for monitoring various conditions in structures such as greenhouses, equipment storage buildings or livestock buildings. The disclosure will be facilitated, however, by addressing the problem of monitoring a plurality of functions associated with the type of confinement structure or building associated with hog raising.

In relatively large scale commercial hog raising operations, one or more relatively large and expensive buildings are commonly utilized to facilitate the raising and handling of the livestock from farrowing through nursing and finishing. Such buildings are generally compartmentalized or otherwise divided into a number of separate sections or structures, each specifically adapted for performing various tasks associated with livestock raising. For example, one such building or section thereof may comprise a sow house, another section may comprise a farrowing house having one or more separate rooms or compartments therein, yet another section may comprise a nursery, another section or portion comprises a breeding house, and still other sections or portions comprise finishing houses. It will be appreciated that the investment involved in such extensive facilities as well as the value of a large stock of animals, calls for measures to insure against loss, damage or destruction of buildings and/or livestock. More particularly, it is desirable to monitor temperature, ventilation and water supply in each section to insure proper conditions for the livestock. Also, it is desirable to rapidly detect fire or any entrance or exit doors of the structure being left open to protect both the structure and the livestock. Further, it is desirable to monitor the power supplied to the structure to insure the continuing functioning of electrically powered equipment, such as water pumps, ventilation fans and the like.

It will be appreciated that keeping watch over all of the foregoing parameters simultaneously at a plurality of locations throughout one or more relatively large structures is difficult and expensive to accomplish by the use of a watchman, inspector or the like periodically making rounds about the structures to check on the status of the foregoing parameters and functions around the clock.

OBJECTS AND SUMMARY

Accordingly, it is a general object of this invention to provide a monitor for simultaneously monitoring a plurality of functions and providing indications in response to variations in the values of the monitored functions from predetermined desired values thereof.

A more specific object of this invention is to provide a monitor for a plurality of functions associated with a livestock confinement structure, including fire and intrusion detection, and temperature, water supply, ventilation and power supply monitoring.

Still another object of this invention is to provide a monitor in accordance with the foregoing objects, which is adapted to present a unified display of the conditions of the functions being monitored, at a console or the like which may be conveniently located in a central office.

Yet another object of this invention is to provide a monitor, in accordance with the foregoing objects, which is capable of simultaneously monitoring a plurality of sensors at different locations associated with each function or parameter and providing an indication of the identity of the particular sensor at which a malfunction is being indicated, if any.

Still another object of this invention is to provide a monitor in accordance with the foregoing objects, which is further adapted to provide a second indication, simultaneously with that at the console, at a remote location therefrom.

Briefly, in accordance with one embodiment of the invention, a monitor for a live stock confinement structure comprises a plurality of sensor means disposed at a plurality of locations about said sturcture for detecting and monitoring a plurality of functions and providing electrical signals corresponding respectively thereto. Circuit means are provided including a first indicator circuit means connected to predetermined ones of the sensor means for producing indication signals in response to a variation in the electrical signals therefrom from predetermined ranges of values. The circuit means further includes second indicator circuit means connected to predetermined ones of said sensor means for providing indication signals in response to predetermined values of the electrical signals. In a preferred embodiment, means are provided connected with the indicator circuit means for connecting a plurality of temperature, ventilation, power failure, and fire sensors thereto to be repeatedly and sequentially monitored, and for identifying the particular one or ones of said sensors for which an indication, if any, is being given.

Other objects, features, and advantages of the invention will become more readily apparent upon consideration of the following descriptions, together with the accompanying drawings wherein like reference numberals are used throughout to designate like elements and components.

DETAILED DESCRIPTION

Figure 1:
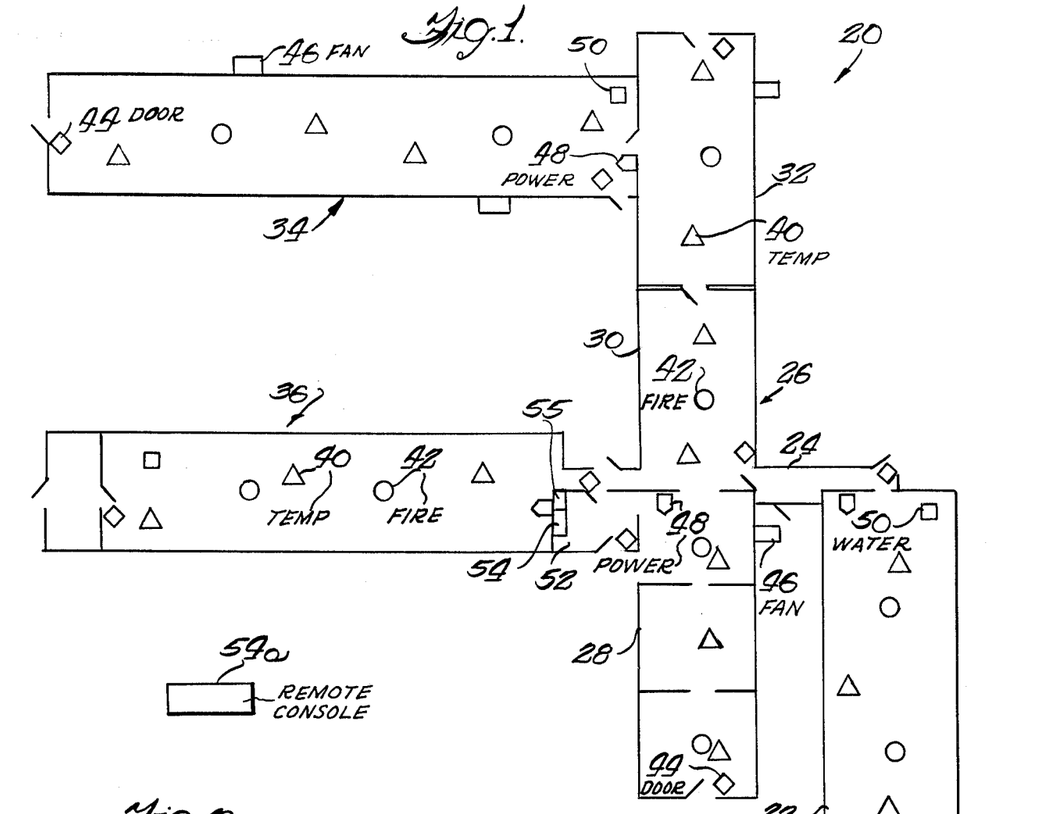
FIG. 1 is a diagrammatic illustration of a livestock confinement building including a monitor according to the present invention.

Referring now to FIG. 1, a typical livestock confinement structure 20 is shown in conjunction with a monitor according to the present invention. For purposes of describing the invention the structure 20 is illustrated as a hog confinement structure. However, since the structure 20 comprises no part of the present invention it will not be described in detail. Suffice it to say that the structure 20 includes a first portion 22 comprising a sow house, connected by a passage way 24 to a second portion or building designated generally 26 which is divided or compartmentalized into three areas comprising a farrowing house 28 having three sections, a nursery 30 and a breeding house 32. The breeding house 32 and the nursery 30 are connected with additional portions of the structure 20, designated generally 34 and 36, and comprising finishing houses. A plurality of sensors for functions associated with the livestock confinement structure 20 are symbolically illustrated at a plurality of locations therein. A plurality of temperature sensors 40 are illustrated generally as triangles disposed in a plurality of locations about the structure 20. Similarly, a plurality of fire sensors 42 are illustrated as circles and also distributed in a plurality of locations about the structure. Also, a plurality of door or entrance sensors 44 are illustrated as diamonds and located adjacent to respective entrance doors located about the structure 20. Similarly, a plurality of ventilation or fan sensors 46 are illustrated as rectangles placed at a plurality of locations about the structure 20, and a plurality of power sensors 48 are illustrated as pentagons and also placed at a plurality of locations about the structure. Also, a plurality of water supply or water pressure sensors 50 are illustrated as squares and conveniently located adjacent water supply inlets at a plurality of locations about the structure 20. An office 52 is included in the structure 20 and a monitor console 54 is preferably located within the office 52 and connected with all of the sensors by suitable connecting wires or cables (not shown), to monitor the functions associated therewith.

Figure 2:
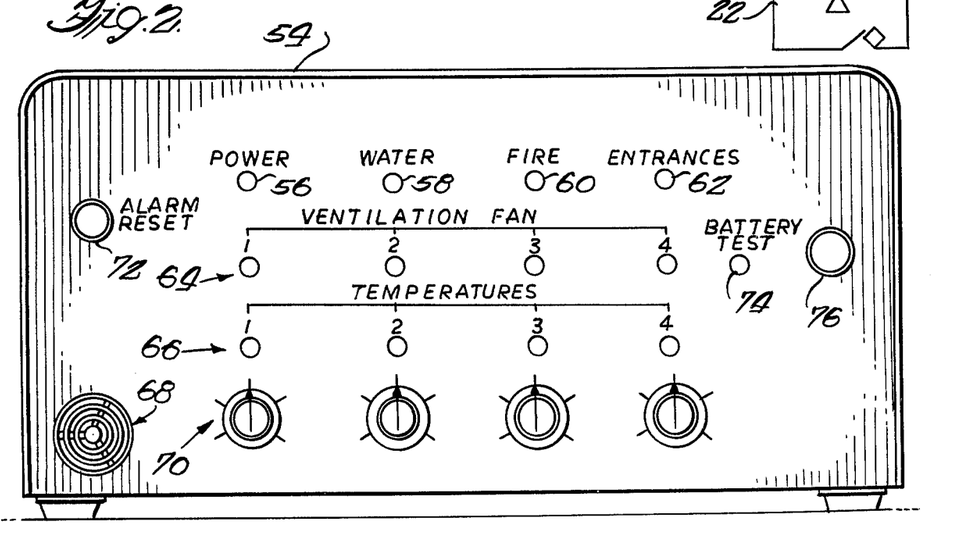
FIG. 2 is a front elevational view of a control console of a monitor according to the present invention.

Referring to FIG. 2, a front panel of the console 54 is illustrated in additional detail. The console 54 preferably contains suitable monitoring circuits, to be described later, for receiving signals from the sensors, corresponding to the functions being monitored thereby, and providing suitable indication signals in response to predetermined conditions as detected by the sensors. The console 54 also includes a plurality of indicator means on the front panel thereof, for providing suitable visual and/or audible indications corresponding to the functions monitored or detected at the sensors departing from preselected desired values, or ranges of values. In the illustrated embodiment the indicators of the console 54 include four indicators 56, 58, 60 and 62 for providing indications corresponding to loss of power supply, low water pressure, fire, and unauthorized intrusion or opening of entrances or doors, respectively. Similarly, four indicators designated generally 64 are provided for giving an indication corresponding to the ventilation of air flow, as detected at four different predetermined ones or groups of the ventilation sensors, 46, falling below a predetermined desired value. Four temperature indicators designated generally 66 are provided for giving an indication that the temperature, as detected at four predetermined temperature sensors 40 or groups thereof, are variance with a preselected range of temperatures. The console also includes an audible alarm 68 for producing an audible indication simultaneously with indications from any of the visual indicators, which may be in the form of LED's, 56 thru 66 thereof. Also included, in conjunction with the temperature indicator LED's 66 are four temperature range selector controls designated generally 70, each being selectively adjustable to select one of up to four different ranges of temperatures as the desired temperature range associated with each of the corresponding temperature indicators 66. The console 54 is also provided with an alarm reset control 72 for resetting the audible alarm means 68 following an alarm or indication being given thereby, for giving subsequent indications. Also, an external battery (not shown) is provided for maintaining monitoring functions during a power outage. Therefore, a battery test function is provided including a switch 76 and indicator LED 74, for testing the battery, as desired, to insure the battery being charged.

Figures 3, 4:
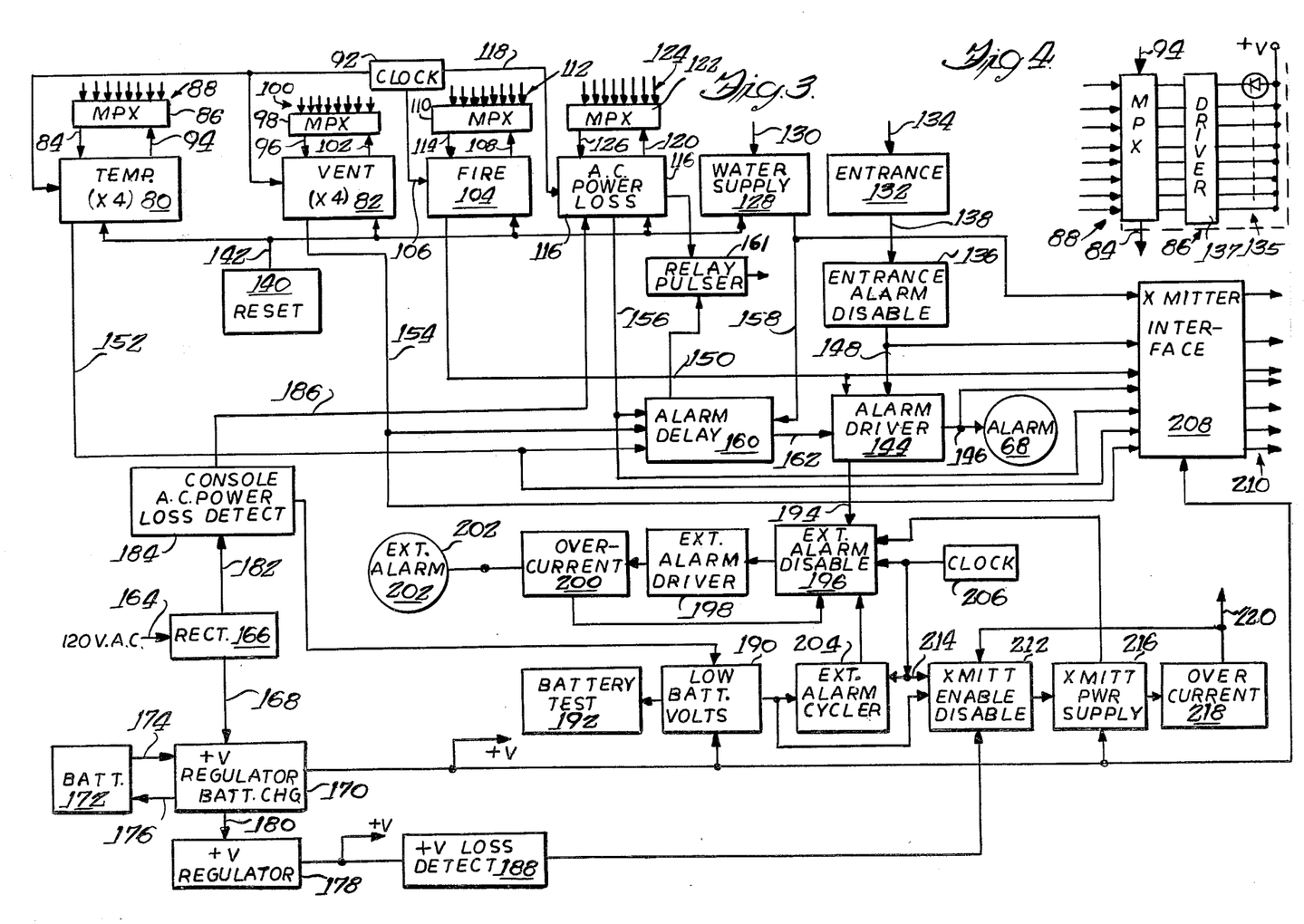
FIG. 3 is a block diagrammatic representation of a monitor circuit according to the present invention.
FIG. 4 is a diagram of a portion of the circuit of FIG. 3.

Referring now to FIG. 3, a monitor circuit according to the present invention is shown in block diagrammatic form. Blocks 80 and 82 represent one of four identical temperature indicator circuits 80 and one of four identical ventilation circuits 82 respectively. The temperature indicator circuits 80 each have an input 84 connected to a multiplexer circuit 86, which has eight inputs in a preferred embodiment designated generally 88. Each multiplexer 86 is selectively connectable to as many as eight temperature sensors 40, to be sequentially connected thereby with one of the temperature indicator circuits 80, each of which includes one of the temperature range selectors 70 and temperature indicators 66 of FIG. 2. The temperature indicator circuits each include a clock input line 90 from a clock 92 and a gated clock output line 94 to the multiplexer 86 for providing appropriate clock signals to control the multiplexer 86. It will be appreciated that in an application requiring four or fewer temperature sensors, the multiplexer 86 would not be required, each temperature sensor 40 being connected at the input 84 to a corresponding one of the temperature indicator circuits 80.

Similarly, each of the ventilation indicator circuits 82 receives an input on a line 96 from one of four multiplexer circuits 98, each including eight inputs 100 in a preferred embodiment for connection with up to eight ventilation sensors 46, to be sequentially connected thereby to a ventilation indicator circuit 82, including a ventilation indicator 64. An input of the illustrated ventilation indicator circuit 82 is connected to the line 90 to receive a clock signal from the clock 92 and an output 102 of the ventilation indicator circuit 82 is connected with the illustrated multiplexer 98 to provide appropriate clock control signals thereto. In an application requiring four or fewer ventilation sensors, the multiplexers 98 would not be required, each sensor 46 being connected directly via the line 96 to a corresponding one of the ventilation indicator circuits 82.

A fire indicator circuit 104 including the fire indicator 60 is connected via a line 106 to the clock 92 and via a line 108 to a multiplexer circuit 110 having eight inputs in a preferred embodiment designated generally 112 for connection with up to eight fire sensors 42 of FIG. 1. The fire indicator circuit 104 is adapted to provide an appropriate clock input control signal via the line 108 to the multiplexer 110, and has an input connected to a line 114 from the output of the multiplexer 110 for receiving the signals associated with the individual fire sensors as selected by the multiplexer 110. Similarly, an AC power loss indicator circuit 116, including the indicator 56, is connected by a line 118 to the clock 92 and by a line 120 to a multiplexer circuit 122, for providing suitable clock control signals thereto. The multiplexer 122 is provided with eight inputs 124 for connection with up to eight power sensors 48 of FIG. 1. The AC power loss indicator circuit 116 also has an input connected by a line 126 to an output of the multiplexer to receive signals from individual ones of the power sensors 48, as selected by the multiplexer 122.

As illustrated in FIG. 4, for the multiplexer circuit 86, each multiplexer circuit, such as the multiplexer circuits 86, 98, 110 and 122, includes indicators such as LED's 135 and a suitalbe driver 137 therefor, responsive to the selection of individual sensors thereby, for identifying the sensor selected.

A water supply indicator circuit 128 including the indicator 58, has an input connected by line 130 to the water supply sensors 50. The water supply sensors 50 are preferably water pressure sensors which are actuated to present a short circuit to ground when the water pressure there at falls below a predetermined desired level. Thus, the water pressure sensors 50 are preferably connected in parallel, with their outputs connected in common to the line 130.

Similarly, an intrusion or entrance indicator circuit 132 including the indicator 62 has an input connected by line 134 to the door or entrance sensors 44. The door or entrance sensors preferably comprise normally closed switches which are actuated to an open position in response to their respective doors or entrances being opened. Thus, the entrance sensors are preferably connected in series with the input on line 134 of the entrance indicator circuit 132.

An entrance alarm disable circuit 136 is connected by line 138 to the entrance indicator circuit 132 for optionally disabling the indication signals therefrom, as for example, during normal working hours when it is not desirable to have an alarm given in response to the doors of the structure being opened.

A reset circuit 140 is connected via a line 142 to reset audible alarm outputs (to be described below) of the respective temperature, ventilation, fire, power and water indicator circuits, for resetting the respective outputs following any alarms given thereby, so that the circuits are ready to give subsequent alarms.

The audible alarm 68 is connected to an alarm driver circuit 144 via a line 146, to be driven thereby in response to indications from the respective indicator circuits. The entrance alarm disable circuit 136 is connected to one input of the alarm driver via a line 148. Similarly, the fire indicator circuit 104 is connected to the input of the alarm driver circuit 144 via a line 150. The temperature, ventilation, AC power loss and water supply indicator circuits 80, 82, 116 and 128, are each provided with suitable outputs connected via lines 152, 154, 156 and 158, respectively to inputs of an alarm delay circuit 160 which has an output connected via a line 162 to the alarm driver circuit 144. The alarm delay circuit 160 provides a delay for a predetermined amount of time in actuating the alarm 68 in response to the indication signals from the respective indicator circuits connected thereto. This prevents a "false alarm" due to transient signals, or the like, or an alarm being given in response to a temporary indication signal, when the associated condition rapidly returns to normal.

It will be noted that the fire indicator circuit 104 and entrance indicator circuit 132 are not connected to the alarm delay circuit 160, whereby alarm indications responsive thereto are not delayed before triggering the alarm 68 via the alarm driver 144. Further, it will be noted that the reset circuit 140 is not connected with the entrance indicator circuit 132, but rather the entrance alarm disable circuit 136 is adapted to provide a reset function therefor.

120 volt AC power is supplied to the monitor circuits via a line 164 connected to an input of a rectifier circuit 166. The rectifier circuit 166 is connected via a line 168 to a first voltage regulator circuit and battery charging circuit 170 which is connected with an external battery 172, for providing suitable DC power via a line 174 to the voltage regulator 170, as for example, when there is a failure in the 120 volt AC line. The battery charger portion of the circuit 170 is connected via a line 176 to the battery 172 to provide for charging thereof. A second voltage regulator 178 is connected to an output of the first voltage regulator 170 via a line 180. The voltage regulators 170 and 180 provide suitable sources of positive DC voltage at their outputs for powering the remaining monitor circuits of FIG. 3. The rectifier circuit 166 is also connected via a line 182 to an AC power loss detector 184 which is connected via a line 186 to an additional input of the AC power loss indicator circuit 116, for providing an indication of loss of AC power to the monitor circuits of FIG. 3.

The voltage regulator 178 is connected to an input of a positive DC voltage loss detector circuit 188 and similarly, the voltage regulator 170 is connected to an input of a low battery voltage detector circuit 190, which has an output connected to a battery test circuit 192, including the battery test switch 76 and LED 74 of the console 54 of FIG. 2.

The alarm driver circuit 144 is also connected via a line 194 to an external alarm disable circuit 196 whose output is connected to the input of an external alarm driver circuit 198 whose output is connected to an input of an over current detection circuit 200, whose output is connected to an external alarm 202. The external alarm 202 may be an audible alarm such as a bell or the like mounted upon an exterior wall or the like of the structure, and activated by the foregoing indicator circuits in a similar manner to the audible alarm 68 of the console 54 of FIG. 2. It will be noted, however, the low battery voltage detector circuit 190 is connected to the external alarm disable 196 via an external alarm cycle circuit 204. A clock circuit 206 is connected to another input of the external alarm disable circuit 196 and to the alarm cycle circuit 204, and the over current detector circuit 200 is connected to yet another input of the external alarm disable 196. The foregoing circuits and connections cause the external alarm 202 to give an intermittant signal in response to detection of AC power loss and a low voltage condition of the battery 172 simultaneously, in order to cause a minimum drain on the battery power under such conditions. In a preferred embodiment the alarm is adapted to automatically cycle on for substantially 30 seconds and off for substantially 3 minutes and 45 seconds.

In a preferred embodiment, a remote console 54a, similar to the console 54 of FIG. 2, but without the temperature range adjustment settings 70 thereof, may be provided in a location remote from the livestock structure as shown in FIG. 1, as for example in a nearby farm house or the like. A radio transmitter 55 of known construction provided, as shown in FIG. 1, preferably adjacent the console 54. The remote console 54a includes a radio receiver of known construction, adapted to actuate the indicators thereof in the same manner described for the console 54 of FIG. 2. To facilitate this remote signal transmission, a transmitter interface circuit 208 is provided, having appropriate inputs thereof connected to the temperature, ventilation, fire, AC power loss, and water supply indicator circuits and to the entrance alarm disable circuit 136. The transmitter interface circuit 208 also has an input connected to the voltage regulator circuit 170, for supplying a suitable DC regulated voltage thereto. The transmitter interface circuit 208 is adapted to present appropriate signals on seven outputs thereof, designated generally 210, to drive the transmitter 55 for providing appropriate signals to the above mentioned remote console-receiver 54a, for providing suitable indications thereto corresponding to malfunction or failure of any of the monitored functions. A transmitter enable/disable circuit 212 is also provided, having inputs from the positive voltage regulator 178 via the positive voltage loss detector 188 and from the positive voltage regulator 170 via the low battery voltage detector 190. The transmitter enable/disable circuit 212 and the alarm cycler circuit 204 are both connected with and the clock circuit 206 by a connecting line 214. A transmitter power supply circuit 216 is connected to an output of the transmitter enable/disable circuit 212 and also has an input from the voltage regulator circuit 170, and an output connected to an over current detector circuit 218. The over current detector circuit 218 has an output connected to an input of the transmitter enable/disable circuit 212 and also connected by a line 220 to provide suitable source of power for the transmitter. The transmitter power supply circuit 216 is also connected with an input of the external alarm disable circuit 196 to provide for an alarm signal to be given by the external alarm 202 in response to a loss of power to the transmitter 55.

Figure 5A:
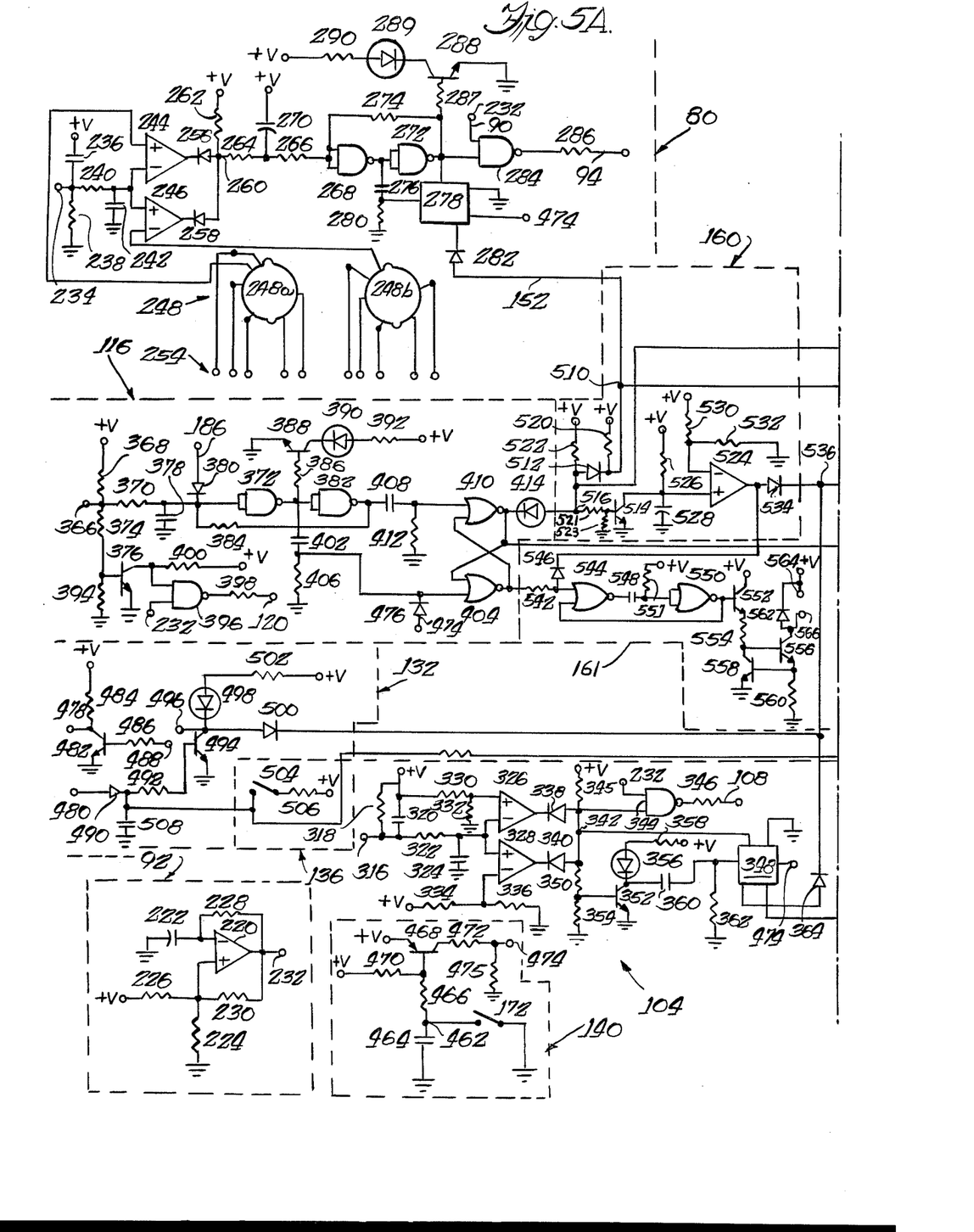
FIGS. 5A and 5B taken together form a schematic circuit diagram of a portion of a monitor circuit according to the present invention.
Figure 5B:
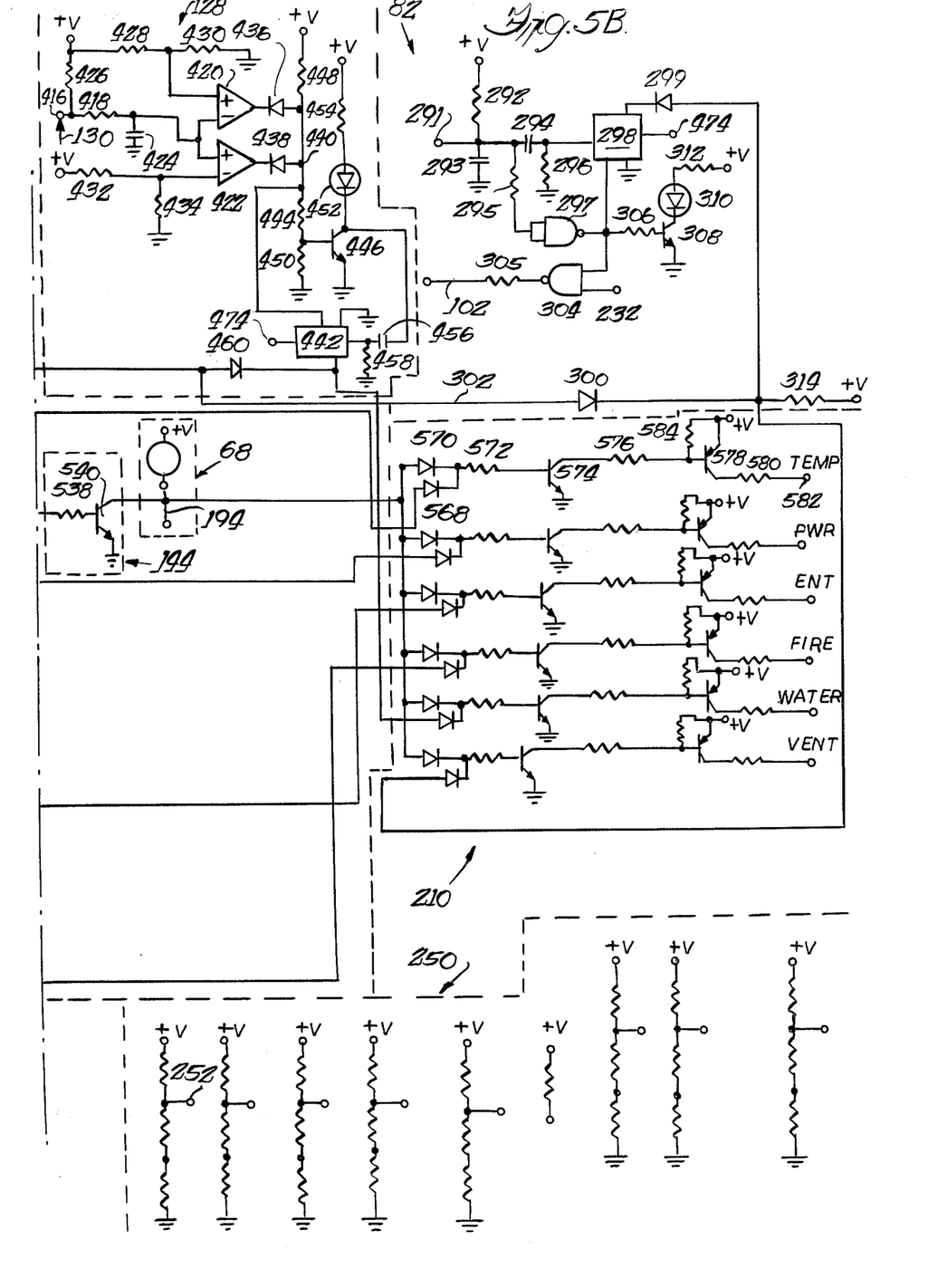

Referring now to FIGS. 5A and 5B, a schematic circuit diagram illustrates a portion of the circuits of FIG. 3 in additional detail. FIGS. 5A and 5B, taken together comprise a single circuit diagram, the left-hand side of FIG. 5B being a continuation from the right-hand side of FIG. 5A.

Referring to the lower left portion of FIG. 5A, the clock circuit 92 comprises an oscillator circuit including an operational amplifier 220 having its inverting input connected via a capacitor 222 to ground, and its noninverting input connected via a resistor 224 to ground and via a resistor 226 to a positive voltage supply. Feedback resistors 228 and 230 are connected between the output of the operational amplifier 220 and the inverting and noninverting inputs thereof, respectively. The clock oscillator circuit 92 provides a suitable clock frequency signal at its output at a terminal 232 which is connected to the output of the operational amplifier 220.

Referring now to the upper portion of FIG. 5A, a temperature indicator circuit 80 comprises one of four identical temperature indicator circuits, but only one such circuit need be shown in detail. An input terminal 234 of the temperature indicator circuit 80 is connected to receive a temperature signal from one of the temperature sensors 40 of FIG. 1, or, in a preferred embodiment, wherein more than four temperature sensors are utilized, the terminal 234 is connected to the output of a multiplexer circuit such as the circuit 86 of FIGS. 3 and 4 for sequentially and repeatedly connecting up to eight temperature sensors to the terminal 234. The terminal 234 is connected via a capacitor 236 to a positive voltage supply, via a resistor 238 to ground, and via a resistor 240 to an input of a window comparator circuit, which input is also connected via a capacitor 242 to ground.

The window comparator circuit comprises a pair of operational amplifiers 244 and 246, the inverting input of the operational amplifier 244 and the noninverting input of the operational amplifier (op amp) 246 being connected in common to the side of the resistor 240 opposite the input terminal 234. The op amp 244 compares the input signal to a reference "upper limit" voltage at the noninverting input thereof, while the op amp 246 compares the input signal to a reference "lower limit" voltage provided at the inverting input thereof. The upper and lower limit voltages are selected via a double pole rotary switch 248, having a front side thereof 248a connected with the noninverting input of the op amp 244 and a back side thereof 248b connected with the inverting input of the op amp 246. The position of the rotary switch 248 is selectively adjustable to connect each of the aforementioned op amp inputs with one of up to five different reference voltages. The different reference voltages are provided by a plurality of voltage dividers, designated generally 250, illustrated in the lower portion of FIG. 5B.

Each voltage divider 250 comprises one or more fixed resistors connected in series between a positive voltage supply and ground and having an output terminal 252, the resistors being chosen to provide a different reference voltage at each output terminal 252. The output terminals 252 are selectively connectable with terminals 254 of the switch 248, to provide any desired combination of reference voltages thereto. The upper and lower limit reference voltages thus provided correspond to a plurality of upper and lower limit temperature, thus providing a plurality of temperature ranges for the window comparator comprising the op amps 244 and 246.

The output of the op amp 244 is connected to the cathode of a diode 256, and similarly, the output of the op amp 246 is connected to the cathode of a diode 258. The anodes of the diodes 256 and 258 are connected together at a terminal 260 which is connected via a resistor 262 to a positive voltage supply. The terminal 260 is also connected via a pair of series connected resistors 264 and 266 to both inputs of a two input NAND gate 268 connected as an inverter, the junction of the resistors 264 and 266 being connected via a capacitor 270 to a positive supply. The output of the NAND gate 268 is connected to both inputs of a two input NAND gate 272 also connected as an inverter, whose output is connected via a resistor 274 back to the inputs of the NAND gate 268. Thus, when the input voltage, representing the temperature at a temperature sensor connected at the terminal 234, is not within the temperature range provided as described above, the output of the comparator comprising the op amps 244 and 246, at the terminal 260, goes to logic "0" which causes the output of the NAND gate 268 to go to logic "1" and the output of the NAND gate 272 to go to logic "0".

The connections of the resistors 266 and 274 with the NAND gate 268 and 272 provide a hysteresis to facilitate positive logic switching thereof when the input signal at the terminal 234 is passing slowly in either direction through a limit of the range provided therefor, which might otherwise cause some oscillation of the output of the window comparator. Such oscillation is also averaged or filtered by the resistor 264 and capacitor 270, whereby an averaged DC level causes the logic level switching of the NAND gates 268 and 272.

The output of the NAND gate 268 is connected via a capacitor 276 to the SET input of a D flip-flop 278, which input is also connected via a resistor 280 to ground. The flip-flop 278 has a $\overline{Q}$ input connected to the cathode of a diode 282 and a clock input connected to the output of the inverter 272. The output of the inverter 272 is also connected to one input of a two input NAND gate 284 whose other input is connected to the line 90 from the terminal 232 of the clock circuit 92, and whose output is connected via a resistor 286 to the line 94, which comprises a clock input line to the multiplexer 86, as described above with reference to FIG. 3. The output of the NAND gate 272 is also connected via a resistor 287 to the base electrode of a NPN transistor 288, whose emitter electrode is connected to ground and whose collector electrode is connected to the cathode of a light emitting diode (LED) 289, which comprises one of the indicators 66 of FIG. 2 whose anode is connected via a resistor 290 to a positive voltage supply. Thus, when the temperature, as represented by the signal input at the terminal 234 is within the temperature range selected by the switch 248, the output terminal 260 from the window comparator and therefore the output of the NAND gate 272 will be at logic "1", turning on the transistor 288 to light the LED 289.

Conversely, when the temperature is not within the range selected by the switch 248, the terminal 260 and therefore the output of the NAND gate 272 will go to logic "0", turning off the transistor 288 and thereby turning off the LED 289, thus providing an indication that the temperature is not within the desired range. At the same time, the output of the NAND gate 268 will be at logic "1", causing the output of the flip-flop 278 at the cathode of the diode 282 to go to logic "0". The anode of the diode 282 is connected to an input of the alarm delay circuit 160, for actuating the alarm 68 in response to the temperature at the input 234 being outside of the range set at the switch 248. With the output of the NAND gate 272 at logic "0" the clock signal at the terminal 232 of the input line 90 to the NAND gate 284 is effectively disabled, thus cutting off the clock signal on the line 94 to the multiplexer to stop the operation thereof, at the sensor at which the out of range temperature is detected. When the temperature returns to the desired range, the output of the NAND gate 272 returns to logic "1" turning on the LED 289, enabling the NAND gate 284 and the clock signal to the multiplexer, and clocking the flip-flop 278 to return the output thereof at the anode of the diode 282 to logic "1". It will be appreciated that each of the four temperature indicator circuits 80 is OR-ed to a common input line of the alarm delay circuit 160 via diodes similar to the diode 282.

Four identical ventilation indicator circuits 82 are provided, but only one such circuit need be shown at the upper right-hand portion of FIG. 5B. An input terminal 291 is connected either directly to a ventilation sensor 46, or preferably to the output of a multiplexer such as the multiplexer 98 of FIG. 3 for being sequentially connected to the outputs of a plurality of ventilation sensors. Each ventilation sensor preferably comprises a switch which is closed to contact ground in response to the presence of air flow, and is opened to present an open circuit in the absence of air flow. The terminal 291 is connected via a resistor 292 to a positive voltage supply, via a capacitor 293 to ground, via a resistor 295 to both inputs of a NAND gate 297 which is connected as an inverter, and via a capacitor 294 to the SET input of a D flip-flop 298, which input is also connected via a resistor 296 to ground. The flip-flop 298 has a $\overline{Q}$ output connected to a cathode of a diode 299 whose anode is connected to the cathode of a diode 300, whose anode is connected via a line 302 to an input of the alarm delay circuit 160. The output of the inverter 297 is connected to a clock input of the flip-flop 298, to one input of a two input NAND gate 304, and via a resistor 306 to the base electrode of an NPN transistor 308. The emitter electrode of the transistor 308 is connected to ground, and the collector electrode thereof is connected to the cathode of a light emitting diode (LED) 310, whose anode is connected via a resistor 312 to a positive voltage supply. The NAND gate 304 has its other input connected to the terminal 232 from the clock 92 and its output connected via a resistor 305 to the control input line 102 of the multiplexer 98.

It will be appreciated from the foregoing description, that when the ventilation sensor switch is open, in response to the absence of air flow thereat, the input terminal 291 goes to logic "1" which causes the output of the inverter 297 to go to logic "0", turning off the transistor 308 and thereby turning off the LED 310 which comprises one of the indicators 64 of FIG. 2, to provide an indication of the absence of air flow at the sensor connected to the terminal 291. This also causes the output of the flip-flop 298, at the cathode of the diode 299 to go to logic "0". If air flow at the sensor is restored, the input terminal 291 returns to logic "0", thereby providing a logic "1" at the output of the inverter 297 to clock the flip-flop 298 so that the output thereof at the cathode of the diode 299 goes back to logic "1", and the transistor 308 is again turned on, lighting the LED 310. The NAND gate 304 functions equivalently to the NAND gate 284 of the temperature circuit 80, to selectively gate clock signals to the multiplexer 98. The four ventilation indicator circuits are each OR-ed to the line 302 via a diode similar to the diode 300, a suitable pull-up resistor 314 being provided between the cathodes thereof and a positive voltage supply.

The fire indicator circuit 104 is illustrated in the lower right-hand portion of FIG. 5A. An input terminal 316 is connected to the multiplexer 110, as illustrated in FIG. 3, to receive signals from the fire sensors, as selected thereby. The terminal 316 is connected via the parallel combination of a resistor 318 and a capacitor 320 to a positive voltage supply, and via a resistor 322 to an input of a window comparator circuit, which input is connected via a capacitor 324 to ground. The window comparator circuit includes a pair of operational amplifiers (op amps) 326 and 328, similar in structure and function to the window comparator comprising the op amps 244 and 246 of the temperature indicator circuit 80, described above. The inverting input of the op amp 326 is connected with the noninverting input of the op amp 328 to form the aforementioned input to the comparator at the resistor 322. The noninverting input of the op amp 326 is connected to the junction of a pair of series connected resistors 330 and 332 which are connected between a positive voltage supply and ground to form a voltage divider. Similarly, the inverting input of the op amp 320 is connected to the junction of a pair of series connected resistors 334 and 336 which are connected between a positive voltage supply and ground to form a voltage divider.

The output of the op amp 326 is connected to the cathode of a diode 338 and similarly the output of the op amp 328 is connected to the cathode of a diode 340. The anodes of the diodes 338 and 340 are connected together at a terminal 342, which is also connected via a resistor 344 to a positive voltage supply. The terminal 342 is also connected to one input of a two input NAND gate 344, whose opposite input is connected to the terminal 232 from the clock circuit 92, and whose output is connected via a resistor 346 to the control line 108 of the multiplexer 110 of FIG. 3. The terminal 342 is also connected to the clock input of a D flip-flop 348 and, via a resistor 350 to the base electrode of an NPN transistor 352, which is also connected via a resistor 354 to ground. The emitter electrode of the transistor 352 is connected to ground and the collector electrode thereof is connected to the cathode of a light emitting diode (LED) 356, comprising the indicator 60 of FIG. 2, whose anode is connected via a resistor 358 to a positive voltage supply. The collector electrode of the transistor 352 is also connected via a capacitor 360 to a set input of a D flip-flop 348, which input is also connected via a resistor 362 to ground. The Q output of the flip-flop 348 is connected to the anode of a diode 364, whose cathode is connected to an input of the alarm driver circuit 144.

It will be appreciated from the foregoing description that the window comparator including the op amps 326 and 328 function similarly to the comparator comprising the op amps 244 and 246 of the temperature indicator circuit 80 described above. The fire sensors are adapted to short the terminal 316 to ground in response to either excessive temperature being detected thereat, or to a rate of rise of the temperature detected thereat in excess of a predetermined rate. Under "normal" conditions, the fire sensor presents a predetermined fixed resistance or load at the terminal 316, whereby a predetermined voltage is presented at the input of the window comparator. Thus the window comparator output at the terminal 342 is normally at logic "1" but will go to logic "0" in response to the terminal 316 being to ground by a fire sensor, as described, or in response to the terminal 316 being open circuited, indicating the connection thereof to a fire sensor being broken. The terminal 342 going to logic "0" turns off the transistor 352, turning off the LED 356 to provide an indication of a "fire" condition being detected at the fire sensor.

A logic "0" at the terminal 342 also disables the gate 344, cutting off the clock signal to the multiplexer, to maintain the connection at the terminal 316 to the sensor at which a fire is detected. The transistor 352 being turned off as described, also results in a logic "1" at the SET input of the flip-flop 348, causing the Q output thereof, connected to the anode of the diode 364, to go to a logic "1", actuating the alarm 68. Should the "fire" condition abate, the comparator output at the terminal 342 returns to logic "1". When the terminal 342 is at logic "1", the clock input of the flip-flop 348 is actuated, clocking it back to its original state, and the transistor 352 is turned on, again lighting the LED 356.

The AC power loss indicator circuit 116 has a first input 366 connected to the output line 126 of the multiplexer 122 of FIG. 3, to be sequentially connected thereby with the power sensors 48. The terminal 366 is connected via a resistor 368 to a positive voltage supply, via a resistor 370 to both inputs of a two input NAND gate 372, which is connected as an inverter, and via a resistor 374 to the base electrode of an NPN transistor 376. The inverter 372 also has its inputs connected via a capacitor 378 to ground. The line 186 from the console AC power loss detector 184 is connected to the anode of a diode 380 whose cathode is connected to the input of the inverter 372. The output of the inverter 372 is connected to both inputs of a two input NAND gate 382, connected as an inverter, whose output is connected via a resistor 384 back to the input of the inverter 372. The output of the inverter 372 is also connected via a resistor 386 to the base electrode of an NPN transistor 388, whose emitter electrode is connected to ground and whose collector electrode is connected to the cathode of a light emitting diode (LED) 390, which comprises the indicator 56 of FIG. 2, whose anode is connected via a resistor 392 to a positive voltage supply.

The transistor 376 has its base electrode connected via a resistor 394 to ground, its emitter electrode connected to ground, and its collector electrode connected to an input of a two input NAND gate 396, whose other input is connected to the terminal 232 from the output of the clock circuit 92. The output of the NAND gate 396 is connected via a resistor 398 to the line 120 to the control input of the multiplexer 122 of FIG. 3. A resistor 400 is also provided between the collector electrode of the transistor 376 and a positive voltage supply. The output of the inverter 372 is connected via a capacitor 402 to one input of a two input NOR gate 404 which input is also connected via a resistor 406 to ground. Similarly, the output of the inverter 382 is connected via a capacitor 408 to one input of a two input NOR gate 410 which input is also connected via a resistor 412 to ground. The NOR gates 404 and 410 are interconnected to form a latch. The output of the latch comprising the gates 404 and 410, at the output of the gate 410 thereof is connected to the cathode of a diode 414 whose anode is connected to an input of the alarm delay circuit 160.

It will be appreciated from the foregoing description that the AC power loss circuit may be activated by either the terminal 366 or the line 186 going to logic "1". The power sensors are adapted to cause a logic "1" at the terminal 366 in response to a loss of AC power being detected thereat and similarly, the console AC power loss detector circuit 184, to be described below, provides a logic "1" at the line 186 in response to a loss of AC power to the console. The inverters 372 and 382 provide a hysteresis configuration similar to the circuit comprising the gates 268 and 272 of the temperature indicator circuit 80 described above. Thus, a logic "1" at the input of the inverter 372 from either of the aforementioned sources turns off the transistor 388, thereby turning off the LED 390 to provide an indication of a loss of AC power. At the same time, the output of the inverter 382 goes to a logic "1" setting the latch comprising the gates 404 and 410, so that the cathode of the diode 414 goes to a logic "0", for activating the alarm delay circuit 160.

If power is restored to the console and to the power sensors, the terminal 366 and the line 186 both return to logic "0", causing a logic "1" at the output of the inverter 372, which resets the latch comprising the gates 404 and 410. Also, the transistor 376 will be turned on and off in response to the respective "1" and "0" logic input signals at the terminal 366 and line 186, thereby respective enabling or disabling the clock pulses to the multiplexer 122. Thus, the multiplexer 122 is effectively stopped on any sensor at which a power failure is detected.

The water supply indicator circuit 128 is essentially the same in structure and function as the fire indicator circuit 104, except for the elimination of a gate therefrom comparable to the gate 344, as no multiplexer is provided in conjunction with the water supply indicator circuit 128. It will be noted that the water supply sensors are preferably capable of individual adjustment to a preselected desired water pressure setting. The sensors present an impedance on a line 130 at an input terminal 416 of the circuit 128, such that a logic "1" will be present thereat when the water pressure detected at the respective sensors is greater than or equal to the desired preselected water pressure. When the water pressure at any sensor is less than the desired predetermined water pressure, the sensor will provide a short circuit at the terminal 416, resulting in a logic "0" thereat.

Terminal 416 is connected via a resistor 418 to the inverting input of an operational amplifier 420 and the noninverting input of an operational amplifier 422, which inputs are also connected via a capacitor 424 to ground. The op amps 420 and 422 form a window comparator. The terminal 416 is also connected via a resistor 426 to a positive voltage supply. The inverting input of the operational amplifier 420 is connected to the junction of a pair of series connected resistors 428 and 430 which form a voltage divider between a positive voltage supply and ground. Similarly, the inverting input of the operational amplifier 422 is connected to the junction of a pair of series connected resistors 422 and 434 which form a voltage divider between a positive voltage supply and ground. The outputs of the operational amplifiers 420 and 422 are connected to the respective cathodes of a pair of diodes 436 and 438, whose anodes are connected together at the terminal 440. The terminal 440 is connected to the clock input of a D flip-flop 442, via a resistor 444 to the base electrode of a NPN transistor 446, and via a resistor 448 with a positive voltage supply. The base electrode of the resistor 446 is also connected via a resistor 450 to ground, the emitter electrode thereof is connected to ground, and the collector electrode thereof is connected to the cathode of a light emitting diode (LED) 452, which comprises the indicator 58 of FIG. 2, whose anode is connected via a resistor 454 to a positive voltage supply. The collector electrode of the transistor 446 is also via a capacitor 456 to the SET input of the flip-flop 442, which input is also connected via a resistor 458 to ground. A diode 460 has its cathode connected to the $\overline{Q}$ output of the flip-flop 442 and its anode connected to an input of the alarm delay circuit 160. It will be appreciated from the foregoing description that the water supply indicator circuit 128, operates equivalently to the fire indicator circuit 104, the gate 344 being eliminated therefrom.

As described above, the respective D flip-flops of the temperature, ventilation, fire, and water indicator circuits and the latch comprising the gates 404 and 410 of the AC power loss indicator circuit are reset should be respective sensors return to their "normal" or no failure condition. However, once the alarm 68 has been activated by one of the flip-flops or the latch, via the alarm delay circuit 160 and the alarm driver circuit 144, the reset circuit 140 may be actuated to reset the respective D flip-flop or latch, and turn off the alarms 68 and 202. The reset circuit 140 includes the alarm reset switch 72 of FIG. 2 which has one side thereof connected to ground and the other side thereof connected to a terminal 462. The terminal 462 is connected via a capacitor 464 to ground and via a resistor 466 to the base electrode of a PNP transistor 468, which is also connected via a resistor 470 to a positive voltage supply. The emitter electrode of the transistor 468 is connected to a positive voltage supply and the collector electrode thereof is connected via a resistor 472 to a reset terminal 474 which is also connected via a resistor 475 to ground.

The reset terminal 474 is connected to the reset inputs of the D flip-flops 278, 296, 348 and 442, and to the anode of a diode 476 whose cathode is connected to an input of the gate 404 for resetting the latch comprising the gates 404 and 410. It will be appreciated, that when the alarm reset switch 172 is actuated into contact with the terminal 462, a reset pulse will result at the terminal 474.

The entrance indicator circuit 132 includes a pair of input terminals 478 and 480. Each entrance sensor comprises a switch which is closed when its associated door or entrance is closed and opened when the associated door or entrance is open. The entrance sensors are connected in series between the terminals 478 and 480. The terminal 478 is connected to the collector electrode of an NPN transistor 482 which is also connected via a resistor 484 to a positive voltage supply. The emitter electrode of the transistor 482 is connected to ground and the base electrode thereof is connected via a resistor 486 to a terminal 488. The terminal 480 is connected to the anode of a diode 490 whose cathode is connected via a resistor 492 to the base electrode of an NPN transistor 494, whose emitter electrode is connected to ground. The collector electrode of the transistor 494 is connected to a terminal 496, to the cathode of a light emitting diode (LED), which comprises the indicator 62 of FIG. 2, 498 and to the anode of a diode 500. The anode of the LED 498 is connected via a resistor 502 to a positive voltage supply. The cathode of the diode 500 is connected to an input of the alarm delay circuit 160. It will be appreciated from the foregoing, that the transistor 482 is normally turned off and the transistor 494 turned on, as long as a closed circuit exists between the terminals 478 and 480, that is, all entrances are closed. Thus, the LED 498 is normally lighted.

If any of the entrances is open, an open circuit will exist between the terminals 478 and 480, whereby the transistor 494 will turn off, turning off the LED 498 to provide an indication of an open entrance. The transistor 494 being turned off also activates the alarm driver circuit 144 via the diode 500.

In an alternate embodiment, the terminals 488 and 496 are connected, and the transistors 482 and 494 form a latch, whereby the LED 498 will remain off and the alarm will continue to be activated via the diode 500, upon the opening of a door, and will not return to their normal conditions upon the closing of the door. In this embodiment an entrance enable/disable circuit 136 is provided to reset the latch comprising the transistors 482 and 494 following an indication of an open entrance.

The entrance enable/disable circuit comprises a switch 504, which has one side thereof connected via a resistor 506 to a positive voltage supply and the other side thereof connected to the cathode of the diode 490 and via a capacitor 508 to ground. Thus, when the switch 504 is actuated to complete the circuit between the positive voltage supply and the cathode of the diode 490, the entrance indicator circuit will be reset thereby. Also, the switch 504 may be left in this position to turn on the transistor 494, regardless of the open or closed condition of the entrance sensors. This prevents an indication of an open entrance being given, as for example during normal working hours when it is desireable to open and close the entrances without an indication or alarm being given.

The alarm delay circuit 160 has a first input at a terminal 510, connected with the anodes of the diodes 282 of the temperature indicator circuits 80. The terminal 510 is connected the the cathode of a diode 512 whose anode is connected to a terminal 516. A pair of resistors 520 and 522 are connected between a voltage supply and the anode and cathode of the diode 512, respectively. The anodes of the diodes 300, 414 and 460, from the ventilation, power supply, and water supply indicator circuits 82, 116 and 128, respectively, are also connected to the terminal 516, which forms a second input to the alarm delay circuit 160. An NPN transistor 514 has its base electrode connected via resistors 521 and 523 to the terminal 516 and to ground, respectively, its emitter electrode connected to ground and its collector electrode connected to the noninverting input of an operational amplifier 524, which input is also connected via a resistor 526 to a positive voltage supply and via a capacitor 528 to ground. The inverting input of the operational amplifier 524 is connected to the junction of a pair of series connected resistors 530 and 532, connected between a positive voltage supply and ground. The output of the operational amplifier 524 is connected to the anode of a diode 534 whose cathode is connected to a terminal 536 at an input to the alarm driver circuit 144. The cathodes of the diodes 364 and 500 from the fire and entrance indicator circuits 104 and 132, respectively, are also connected to the terminal 536. The terminal 536 is connected via a resistor 538 to the base electrode of a transistor 540, whose emitter electrode is connected to ground and whose collector electrode is connected to one side of the alarm 68, to form the alarm driver circuit 144. The opposite side of the alarm 68 is connected to a positive voltage supply. It will be appreciated that the resistor 526 and capacitor 528 provide a delay time, as described above, between the onset of a malfunction indication from the temperature, ventilation, water supply or AC power loss indicator circuits and the actuating of the alarm 68. The fire and entrance indicator circuits are connected, however, directly to the alarm driver circuit 144, eliminating the alarm delay circuit, and thus sounding the alarm immediately upon malfunction indications from these two indicator circuits.

A relay pulsing circuit 161 is responsive to the AC power loss indicator circuit 116 and the alarm delay circuit 160 for providing a pulse to an external relay (not shown) in response to the signals therefrom. The output of the NOR gate 404 of the AC power loss indicator circuit 116 is connected via a resistor 542 to one input of a two input NOR gate 544. The output of the operational amplifier 524 of the alarm delay circuit 160 is connected to the cathode of a diode 546 whose anode is connected to the same input of the NOR gate 544. The output of the NOR gate 544 is connected via a capacitor 548 to both inputs of a two input NOR gate 550, which inputs are also connected via a resistor 551 to a positive voltage supply. The output of the NOR gate 550 is connected to the opposite input of the NOR gate 544 and to the base electrode of an NPN transistor 552, whose collector electrode is connected to a positive voltage supply. The emitter electrode of the transistor 552 is connected via a resistor 554 to the base electrode of an NPN transistor 556 and to the collector electrode of a transistor 558. The emitter electrode of the transistor 558 is connected to ground and the base electrode thereof is connected to the emitter electrode of the transistor 556 which is also connected via a resistor 560 to ground. The collector electrode of the transistor 556 is connected to the anode of a diode 562 whose cathode is connected to a positive voltage supply. A pair of terminals 564 and 566 is provided at the cathode and anode of the diode 562, respectively, for connection with an external relay. It will be noted that the NOR gates 544 and 550, the capacitor 548 and the resistor 552 are connected to form a one shot, preferably having a positive pulse output of substantially one second width for pulsing a relay in response to a logic "1" input thereto from the alarm delay circuit 160 via the diode 546.

The external transmitter interface circuit 210 performs the functions of enabling, logic level shifting and buffering between the foregoing circuits and an external transmitter. The circuit 210 includes six identical circuits corresponding to the six functions to be monitored, whereby only one such circuit will be described in detail. A diode 568 has its anode connected to the anode of the diode 282 for receiving the signal from the Q output of the D flip-flop 278 of the temperature indicator circuit 80. A diode 570 has its anode connected to the collector of the transistor 540 of the alarm driver circuit 144. The cathodes of the diodes 568 and 570 are connected together to one side of a resistor 572 whose other side is connected to the base electrode of a transistor 574. The transistor 574 has its emitter electrode connected to ground and its collector electrode connected via a resistor 576 to the base electrode of a PNP transistor 578. The emitter electrode of the transistor 578 is connected to a positive voltage supply, the collector electrode thereof is connected via a resistor 580 to an output terminal 582 to the external transmitter, and a resistor 584 is connected between the base and emitter electrodes of the transistor 578. Similarly, five identical circuits are provided respectively corresponding to the five other functions to be monitored, each has a pair of diodes corresponding to diodes 568 and 570 at an input thereof, one being connected to the alarm driver circuit 144 and one being connected to the corresponding flip-flop or latch output of a respective one of the indicator circuits. Thus, the turning on of the transistor 540 of the alarm driver circuit 144 causes the outputs of the circuit 210 to stop sourcing current, corresponding to a failure at a corresponding indicator circuit.

Figure 6A:
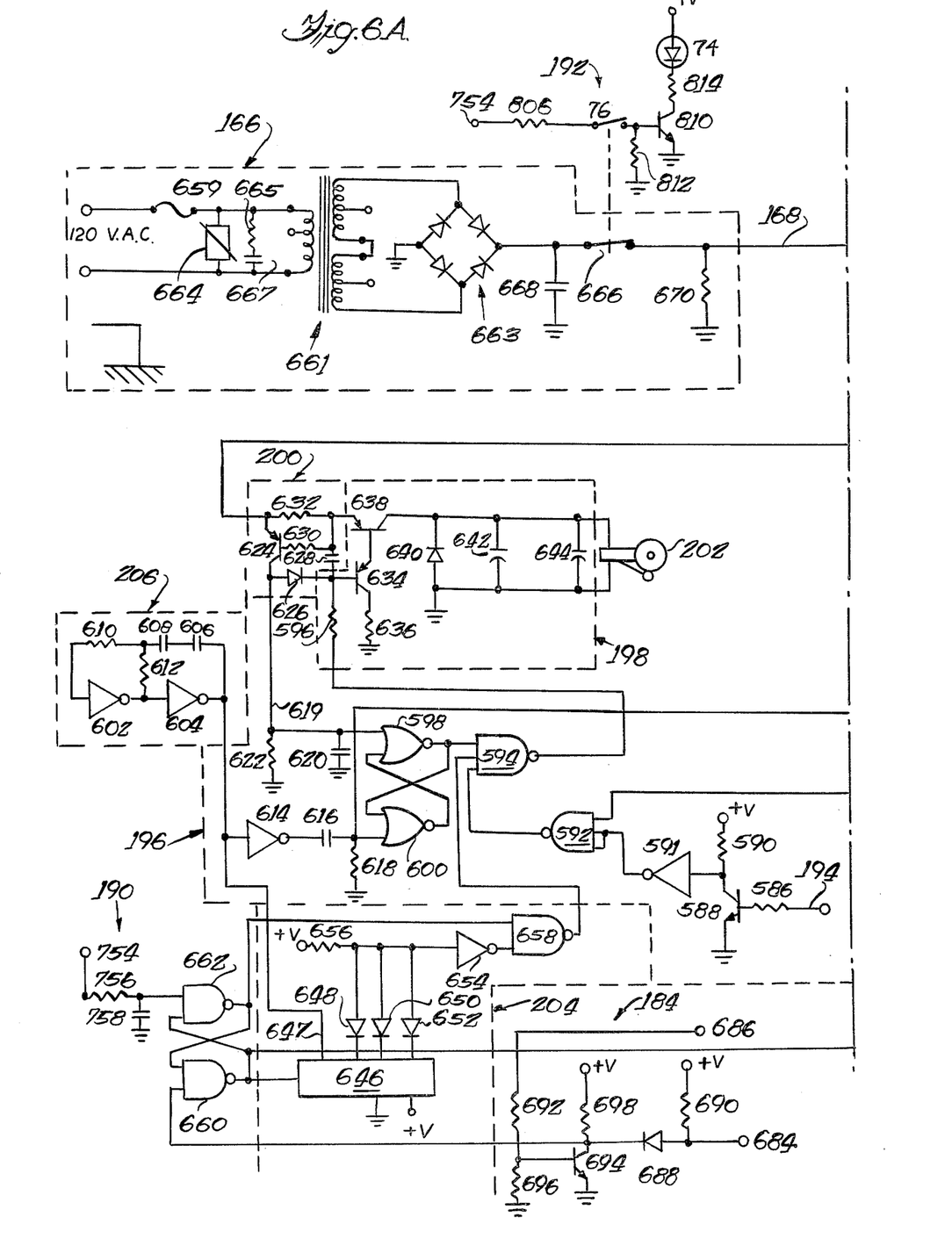
FIGS. 6A and 6B taken together form a schematic circuit diagram of a further portion of a monitor circuit according to the present invention.
Figure 6B:
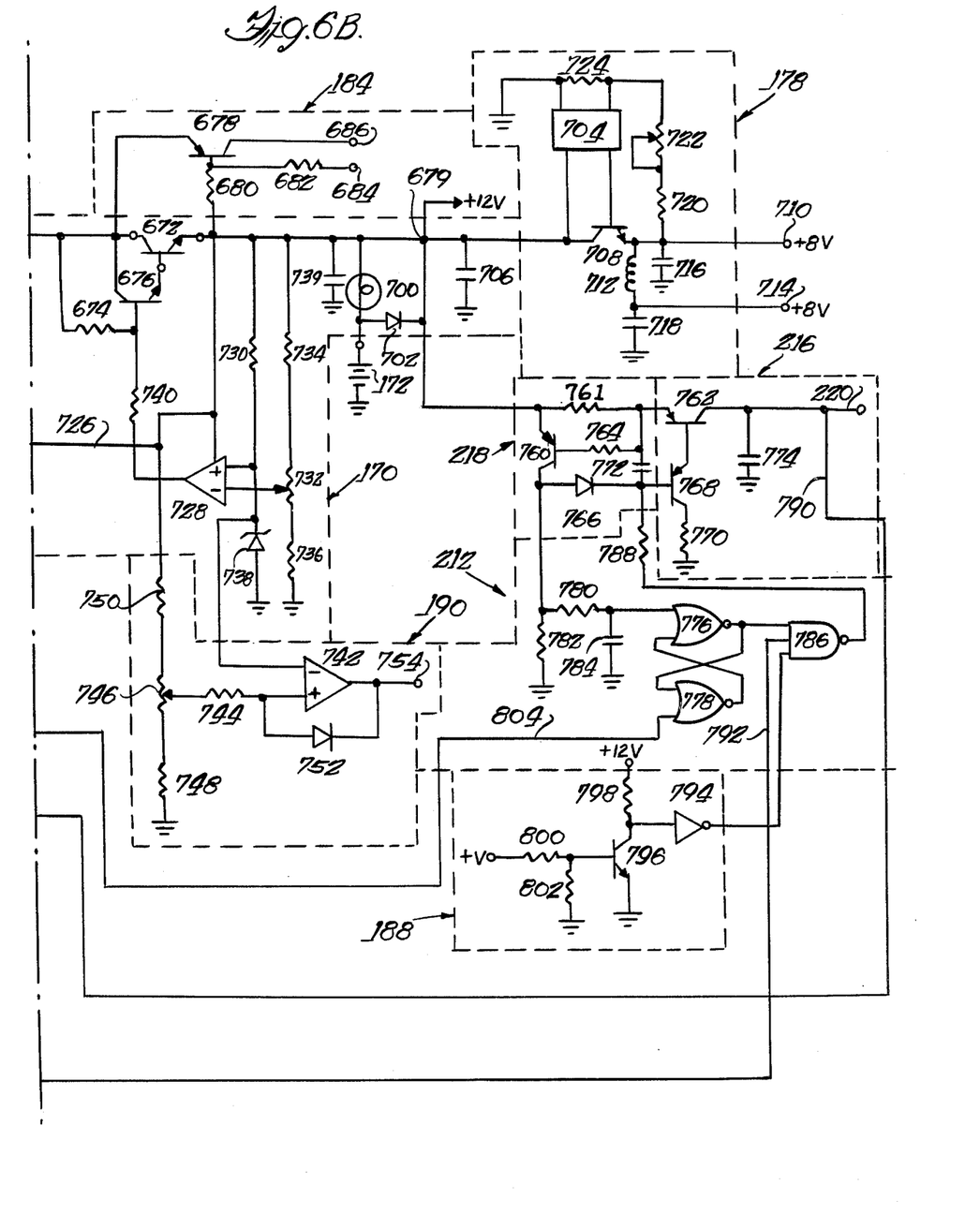

Referring now to FIGS. 6A and 6B, it will be noted that FIG. 6B forms a continuation of FIG. 6A from the right-hand portion thereof, in the same manner as FIGS. 5A and 5B above. The external alarm enable/disable circuit 196 has an input connected to the line 194 from the collector electrode of the transistor 540 of the alarm driver circuit 144 of FIG. 5B. The line 194 is connected via a resistor 586 to the base electrode of an NPN transistor 588 whose emitter electrode is connected to ground and whose collector electrode is connected via a resistor 590 to a positive voltage supply. The collector electrode of the transistor 588 is also connected to the input of an inverter 591 whose output is connected to two inputs of a three input NAND gate 592. The output of a NAND gate 592 is connected to one input of a three input NAND gate 594 whose output is connected via a resistor 596 to one input of the external alarm driver circuit 198. A pair of two input NOR gates 598 and 600 are connected to form a latch, the output of the NOR gate 598 being connected to a second input of a three input NAND gate 594.

The clock circuit 206 comprises an inverter 602 whose output is connected to the input of an inverter 604, whose output is connected in series with a capacitor 606, a capacitor 608 and a resistor 610 to the input of the inverter 602. A resistor 612 is connected between the junction of the capacitor 608 with the resistor 610 and the output of the inverter 602. The output of the clock circuit 206, at the output of the inverter 604 thereof, is connected to the input of an inverter 614 of the alarm enable/disable circuit 196, whose output is connected via a capacitor 616 to an input of the NOR gate 600, which input is also connected via a resistor 618 to ground.

The second input of the NOR gate 598 is connected by a line 619 to an output of the over current detector circuit 200 which output is also connected via a capacitor 620 to ground and via a resistor 622 to ground. The over current detector circuit 200 comprises a PNP transistor 624 whose collector electrode is connected to the line 619 and also to the anode of a diode 626 whose cathode is connected in series with a capacitor 628 and a resistor 630 to the base electrode of a PNP transistor 624. A resistor 632 is connected between the emitter electrode of the transistor 624 and the junction of the capacitors 628 with the resistor 630. The cathode of the diode 626 is also connected to the input, at the resistor 596, of the alarm driver circuit 198, which input is connected to the base electrode of a PNP transistor 634. The collector electrode of the transistor 634 is connected via a resistor 636 to ground, and the emitter electrode thereof a PNP transistor 638. The emitter electrode of the transistor 638 is connected to the junction of the resistor 632 with the resistor 630, and the collector electrode thereof is connected to one side of the alarm 202 whose other side is connected to ground. A diode 640 has its cathode connected to the collector electrode of the transistors 638 and its anode connected to ground. A pair of capacitors 642 and 644 are connected in parallel with the alarm 202.

The external alarm cycler circuit 204 includes a 12-stage ripple-carry binary counter/divider (C/D) 646, which has a clock input 647 thereof connected to the output of the clock circuit 206 at the output of the inverter 604 thereof. The eight, ninth and tenth stage outputs of the C/D 646 are each connected to the cathode of a respective diode 648, 650 and 652. The anodes of the diodes 648, 650 and 652 are connected in common to the input of an inverter 654 which input is also connected via a resistor 656 to a positive voltage supply. The output of the inverter 644 is connected to one input of a two input NAND gate 658, whose output is connected to the remaining input of the three input NAND gate 594. Thus, the C/D 646 is connected to establish a cycle of 1024 clock pulses from the clock 206, in a ratio of substantial 896 clock pulses "off" and 128 clock pulses "on" at the input of the inverter 654. The frequency of the clock 206 is established by the choice the components thereof so that in terms of minutes, the cycle is substantially 3.75 minutes off and 0.5 minutes on. The reset input of the C/D 646 is connected to the output of a NAND gate 660 which is connected with a NAND gate 662 to form a latch, which is a portion of the low battery voltage detector circuit 190.

The AC power line is connected via a suitable fuse 659 across the primary of a transformer 661, whose secondary is connected across a full wave diode bridge 663. The transformer 661 is protected against line transients by a varistor 664 and an RC suppression circuit comprising a resistor 665 and a capacitor 667, both connected across the primary thereof. The output of the bridge 663 is connected to one side of a normally closed switch 666 and via a capacitor 668 to ground. The opposite side of a switch 666 is connected to the line 168 at the input of the positive voltage regulator and battery charging circuit 170, and via a resistor 670 to ground. The line 168 is connected to the collector electrode of an NPN transistor 672 and via a resistor 674 to the base electrode of an NPN transistor 676. The collector electrode of the transistor 676 is connected to the collector electrode of the transistor 672 and to the console power loss detector circuit 184 at the emitter electrode of a PNP transistor 678 thereof. The emitter electrode of the transistor 676 is connected to the base electrode of the transistor 672, whose emitter electrode is connected via a resistor 680 to the base electrode of the transistor 678. The base electrode of the transistor 678 is also connected via a resistor 682 to a terminal 684 and the collector electrode thereof is connected to a terminal 686.

The terminal 684 is connected in FIG. 5A to the input line 186 of the AC power loss indicator circuit 116, and in FIG. 6A to a remaining portion of the circuit 184, at the anode of a diode 688 and also via a resistor 690 to a positive voltage supply. The terminal 686 is connected, in FIG. 6A, via a resistor 692 to the base electrode of a transistor 694 which is also connected via a resistor 696 to ground. The emitter electrode of the transistor 694 is connected to ground and the collector electrode thereof is connected to the cathode of the diode 688 and also via a resistor 698 to a positive voltage supply. The collector electrode of the transistor 694 is also connected to an input of the NAND gate 660, comprising an input to the latch including the gates 660 and 662.

The regulation of the twelve volt DC supply is provided by an operational amplifier 728, whose noninverting input is connected via a resistor 730 to the emitter electrode of the transistor 672 and whose inverting input is connected to the wiper arm of a variable resistor 732, one end of which is connected via a resistor 734 to the emitter electrode of the transistor 672 and the other end of which is connected via a resistor 736 to ground. A zener diode 738 has its cathode connected to the noninverting input of the operational amplifier 728 and its anode connected to ground. The output of the operational amplifier 728 is connected via a resistor 740 to the base electrode of the transistor 676. The voltage of the twelve volt DC regulated output at a terminal 679, connected to the emitter of the transistor 672, is therefore set by the variable resistor 732. A capacitor 739 is connected between the terminal 679 and ground. The battery 172 has its negative side connected to ground and its positive side connected via a lamp 700 to the regulated plus twelve volts at the terminal 679, the lamp 700 serving as a trickle charger for the battery 172. The positive terminal of the battery 172 is also connected to the anode of diode 702 whose cathode is connected to the positive twelve volt regulated DC output terminal 679. Thus, should the voltage at the terminal 679 drop below the voltage of the battery 172, the diode 702 will start conducting, thereby switching the battery in as the source of power.

The voltage regulator circuit 178 provides an eight volt DC regulated power supply, and includes an eight volt regulator integrated circuit (IC) 704 having an input connected to the terminal 679, which terminal is also connected via a capacitor 706 to ground. The output of the voltage regulator integrated circuit (IC) 704 is connected to the base electrode of a transistor 708 whose collector electrode is connected to the input of the IC 704 and whose emitter electrode is connected to a first regulated eight volt DC output terminal 710 and via a coil 712 to a second regulated eight volt DC output terminal 714. Capacitors 716 and 718 are connected between the respective eight volt output 710 and 714 and ground. The emitter electrode of the transistor 708 is also connected via a resistor 720 in series with a variable resistor 722 to a second input of the regulator 704 which is connected via a resistor 724 to a ground output thereof and to ground. The variable resistor 722 is provided for fine adjustment of the eight volt DC regulated output. The regulated positive twelve DC voltage output at the emitter electrode of the transistor 672 is also connected by a line 726 to the emitter electrode of the transistor 624 of the over current detector circuit 200 of FIG. 6A.

The low battery voltage detector circuit 190 includes an operational amplifier 742 whose inverting input is connected to the cathode of a zener diode 738, and whose noninverting input is connected via a resistor 744 to the wiper arm of a variable resistor 746. One side of the variable resistor 746 is connected via a resistor 748 to ground and the other side thereof is connected via a resistor 750 to the terminal 679. A diode 752 has its anode connected to the noninverting input of the operational amplifier 742 and its cathode connected to the output thereof at a terminal 754. The terminal 754 is also connected in FIG. 6A, via a resistor 756 to the second input of the two input NAND gate 662 of the flip-flop including the gates 660 and 662, which input is also connected via a capacitor 758 to ground.

The terminal 679 is also connected to the transmitter power supply and over current circuits 216 and 218, at the emitter electrodes of a PNP transistor 760 and via a resistor 761, the emitter electrode of a transistor 762, respectively. The transistor 762 has its base electrode connected via a resistor 764 to the emitter electrode of the transistor 762 and its collector electrode connected to the anode of a diode 766 whose cathode is connected to the base electrode of a PNP transistor 768. The collector electrode of the transistor 768 is connected via a resistor 770 to ground and the emitter electrode thereof is connected to the base electrode of the transistor 762. A capacitor 772 is connected between the base electrode of the transistor 768 and the emitter electrode of the transistor 762. The collector electrode of the transistor 762 is connected to the transmitter power output line 220, and via a capacitor 774 to ground. The transmitter enable/disable circuit 212 includes a pair of two input NOR gates 776 and 778 connected to form a latch, an input thereto at the remaining input of the gate 776 being connected via a resistor 780 to the collector electrode of the transistor 760, which is also connected via a resistor 782 to ground. A capacitor 784 is provided between the input of the gate 776 and ground. The output of the gate 776 is connected to one input of a three input NAND gate 786, whose output is connected via a resistor 788 to the base electrode of the transistor 768. The transmitter power supply output line 220 is also connected by a line 790 to the remaining input of the three input NAND gate 592 of the external alarm enable/disable circuit 196 of FIG. 6A. A second input of the three input NAND gate 786 is connected by a line 792 to the output of the NAND gate 660 of FIG. 6A, the third input of the three input NAND gate is connected to the output of the positive voltage loss detector circuit 188, at the output of an inverter 794 thereof. The input of the inverter 794 is connected to the collector electrode of a transistor 796 and via a resistor 798 to the twelve volt regulated DC supply. The emitter of the transistor 796 is connected to ground and the base transistor thereof is connected via a resistor 800 to the eight volt regulated DC supply and, via a resistor 802 to ground. The remaining input of the NOR gate 778 of the latch including the gate 776 and 778 is connected by a line 804 to the junction of the capacitor 616 with the resistor 618 at the input of the NOR gate 600 of the external alarm disable circuit 196 of FIG. 6A.

The battery testing circuit 192 is illustrated in the upper portion of FIG. 6A, and has an input connected to the terminal 754 at the output of the operational amplifier 742 of the low battery voltage detector circuit 190 of FIG. 6B. The terminal 754 is connected via a resistor 806 to one side of the switch 76, the other side of which is connected to the base electrode of a transistor 810, which electrode is also connected via a resistor 812 to ground. The emitter electrode of the transistor 810 is connected to ground and the collector electrode thereof is connected via a resistor 814 to the cathode of the light emitting diode (LED) 74 whose anode is connected to a positive voltage supply. It will be noted that the switch 76 is ganged with the switch 666 of the rectifier circuit 166, illustrated therebelow. Thus, when the switch 76 is activated into contact with the base electrode of the transistor 810, the LED 816 will be turned on, indicating the battery voltage is at an acceptable level, or remain turned off, indicating that the battery voltage level is below an acceptable level, depending on the output of the low battery voltage detector circuit 190, which in turn is responsive to the setting of the variable resistor 746 thereof, for selecting the desired voltage level of the battery. Actuating the switch 76 into contact with the base electrode of the transistor 810 simultaneously actuates the switch 666 out of contact with the line 168, thereby cutting off AC power to the circuit, and providing a suitable test mechanism for the AC power loss indicator circuit and response of the alarm circuits thereto.

While a particular embodiment of the invention has been shown and described herein, it will be understood that the invention is not limited thereto. Various changes and modifications may occur to those skilled in the art, and these will be understood as forming a part of the invention insofar as they fall within the spirit and scope of the appended claims.

The invention is claimed as follows:

1. A monitor for performing a plurality of monitoring and detecting functions in a structure comprising: a plurality of sensor means mounted at a plurality of locations about said structure for separately detecting fire and intrusion and for separately monitoring temperature, water supply, ventilation and power supply and for providing a plurality of electrical signals corresponding respectively thereto, circuit means including first indicator circuit means connected with the temperature monitoring sensor means for producing indication signals in response to variations in the electrical signals therefrom from predetermined ranges of values, and second indicator circuit means connected with the sensor means associated with said fire and intrusion detection and with said water supply, power supply and ventilation monitoring for producing separate indication signals in response to predetermined ones of the respective electrical signals from each of said sensors, a plurality of indicator means connected in said first and second indicator circuit means for providing separate indications in response to each of said indication signals and thereby identifying the function for which an indication is being given, and display console means housing said circuit means and said indicator means for presenting a unified display of the functions being monitored.

2. A monitor according to claim 1 wherein said circuit means further includes alarm signal circuit means connected in said first and second indicator circuit means for producing an alarm signal in response to any of said indication signals.

3. A monitor according to claim 2 wherein said circuit means further includes reset means for selectively resetting said alarm signal circuit means in said first and second indicator circuit means when the respective alarm signals are given thereby, to enable said alarm signal circuit means in said first and second indicator circuit means to produce like alarm signals in response to subsequent electrical signals from said sensor means.

4. A monitor according to claim 3 wherein said circuit means further includes delay means connected with said alarm signals circuit means for producing a predetermined delay time between said indication signals responsive to said temperature, water supply, ventilation and power supply sensors and production of said alarm signal, to prevent said alarm signal from being produced in response to transient signals or the like.

5. A monitor for monitoring functions such as temperatures, at a plurality of locations in a structure comprising: temperature sensor means for detecting temperature at a plurality of locations about said structure and for providing a plurality of temperature electrical signals corresponding thereto, and circuit means including temperature indicator circuit means connected with said temperature sensor means for producing temperature indication signals in response to variations in said temperature electrical signals from predetermined ranges of values, wherein said circuit means includes means for providing a plurality of different ones of said predetermined ranges of values, said temperature sensor means includes a plurality of temperature sensors mounted at a plurality of locations about said structure and electrically arranged in a plurality of predetermined groups and said temperature indicator circuit means includes a plurality of temperature indicator circuits, each connected with one of said groups of temperature sensors, and each of said temperature indicator circuits includes operator accessible means for selecting one of said plurality of predetermined ranges of values for its associated group of temperature sensors.

6. A monitor according to claim 5, said circuit means further including means for sequentially connecting the temperature sensors in each of said groups to the temperature indicator circuit associated with that group and for identifying the temperature sensor connected thereby.

7. A monitor according to claim 5, further including fire sensor means located in said structure for providing fire electrical signals in response to a rate of increase of temperature adjacent thereto in excess of a predetermined rate and in response to a temperature adjacent thereto in excess of a predetermined temperature, said circuit means further including fire indicator circuit means connected with said first sensor means for producing a fire indication signal in response to said fire signal, and in response to said fire sensor means becoming disconnected therefrom.

8. A monitor according to claim 7 wherein said fire sensor means comprises a plurality of fire sensors disposed in a plurality of locations about said structure, each capable of producing said fire electrical signals, said circuit means further including means for sequentially connecting said fire sensors to said fire indicator circuit means and for identifying the sensor connected thereby.

9. A monitor according to claim 5 further including water supply sensor means for detecting water pressure of the water supply at a plurality of locations in said structure and for providing a water supply electrical signal when the water pressure is below a predetermined value, said circuit means further including water supply indicator circuit means connected with said water supply sensor means for producing a water supply indication signal in response to said water supply electrical signal, and in response to said water supply sensor means becoming disconnected therefrom.

10. A monitor according to claim 5 further including ventilation sensor means for detecting air flow at a plurality of locations in said structure and providing ventilation electrical signals in response to the absence of air flow, said circuit means further including ventilation indicator circuit means connected with said ventilation sensor means for producing a ventilation indication signal in response to said ventilation electrical signal.

11. A monitor according to claim 5 wherein said circuit means includes a circuit power supply and further including power supply sensor means for providing a power supply electrical signal when the structure's power supply is below a predetermined value, said circuit means further including power supply indicator circuit means connected with said power supply sensor means and with said circuit power supply for producing a power supply indication signal in response to said power supply electrical signal, and in response to said circuit power supply falling below a predetermined value.

12. A monitor according to claim 5 further including intrusion sensor means associated with entrances and the like of said structure for providing an intrusion electrical signal when said entrances are opened, and intrusion indicator circuit means for producing an intrusion indication signal in response to said intrusion electrical signal.

13. A monitor for monitoring a plurality of functions such as ventilation in a livestock confinement structure comprising: ventilation sensor means for detecting air flow at a plurality of locations about said structure and for providing a plurality of electrical signals correspondingly respectively thereto, and circuit means including ventilation indicator circuit means connected with said ventilation sensor means for producing ventilation indication signals in response to variations in said electrical signals from predetermined values, wherein said ventilation sensor means comprises a plurality of ventilation sensors mounted at a plurality of locations in said structure and electrically arranged in a plurality of predetermined groups and said ventilation indicator circuit means includes a plurality of ventilation indicator circuits, each associated with one of said groups of ventilation sensors and wherein said circuit means further includes means for sequentially connecting the ventilation sensors in each of said groups to the ventilation indicator circuit associated with that group and for identifying the ventilation sensor connected thereby.

14. A monitor according to claim 13 wherein said circuit means includes a circuit power supply and power supply indicator circuit means connected with said circuit power supply for producing a power supply indication signal in response to said circuit power supply falling below a predetermined value.

15. A monitor according to claim 14 further including battery means and means for automatically connecting said battery means to provide power for said circuit means in response to said circuit power supply falling below said predetermined value.

16. A monitor according to claim 14 further including a plurality of power supply sensors disposed in a plurality of locations about said structure, said circuit means further including means for sequentially connecting said power supply sensors to said power supply indicator circuit means and for identifying the sensor connected thereby.

* * * * *